(12) United States Patent
Mason et al.

(10) Patent No.: US 10,266,077 B2
(45) Date of Patent: Apr. 23, 2019

(54) CHILD SAFETY SEAT

(71) Applicant: Wonderland Switzerland AG, Steinhausen (CH)

(72) Inventors: Kyle Mason, West Lawn, PA (US); David Andrew Lehman, Lancaster, PA (US); Curtis Hartenstine, Birdsboro, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/791,439

(22) Filed: Oct. 24, 2017

(65) Prior Publication Data

US 2018/0134187 A1 May 17, 2018

Related U.S. Application Data

(60) Provisional application No. 62/461,992, filed on Feb. 22, 2017, provisional application No. 62/420,964, filed on Nov. 11, 2016.

(51) Int. Cl.
*B60N 2/28* (2006.01)
*B60N 2/26* (2006.01)

(52) U.S. Cl.
CPC ............... *B60N 2/265* (2013.01); *B60N 2/28* (2013.01)

(58) Field of Classification Search
CPC .................................. B60N 2/265; B60N 2/28
USPC ............ 297/250.1–256.17, 216.11, 464–488
See application file for complete search history.

(56) References Cited

U.S. PATENT DOCUMENTS

| 5,186,520 | A | 2/1993 | Whitaker | |
|---|---|---|---|---|
| 5,432,985 | A * | 7/1995 | Bernart | A44B 11/04 24/200 |
| 6,152,528 | A | 11/2000 | van Montfort | |
| 6,474,735 | B1 | 11/2002 | Carnahan | |
| 6,508,510 | B2 | 1/2003 | Yamazaki | |
| 6,672,664 | B2 | 1/2004 | Yanaka | |
| 6,676,212 | B1 | 1/2004 | Amirault | |
| 6,857,700 | B2 | 2/2005 | Eastman | |
| 6,916,066 | B2 * | 7/2005 | Sedlack | A47D 13/02 |
| 7,163,265 | B2 | 1/2007 | Adachi | |
| 7,472,955 | B2 | 1/2009 | Crane | |

(Continued)

FOREIGN PATENT DOCUMENTS

| AU | 527654 | 3/1983 |
|---|---|---|
| CN | 1346616 A | 5/2002 |

(Continued)

*Primary Examiner* — Syed A Islam
(74) *Attorney, Agent, or Firm* — Winston Hsu

(57) ABSTRACT

A child safety seat includes a seat back having a routing opening, a seat bottom connected to the seat back for cooperatively providing a seating space with the seat back, a bridge plate having a slot portion and a bending portion, and a safety harness having a shoulder strap and a central adjusting strap. The shoulder strap has two shoulder strap portions slidably routed from a front side of the seat back to a rear side of the seat back through the routing opening. Two rear ends of the two shoulder strap portions located at the rear side of the seat back are permanently coupled to each other through the slot portion. The central adjusting strap is slidably routed to the rear side of the seat back through the seat bottom to be detachably attached to the bending portion for adjusting tightness of the safety harness.

26 Claims, 6 Drawing Sheets

(56) References Cited

U.S. PATENT DOCUMENTS

| | | |
|---|---|---|
| 7,926,874 B2 | 4/2011 | Hendry |
| 7,988,230 B2 | 8/2011 | Heisey |
| 8,177,303 B2 | 5/2012 | Chen |
| 8,262,161 B2 | 9/2012 | Fritz |
| 8,322,788 B2 | 12/2012 | Williams |
| 8,567,862 B2 | 10/2013 | Williams |
| 8,573,695 B2 | 11/2013 | Van Geer |
| 8,845,022 B2 | 9/2014 | Strong |
| 8,870,285 B2 | 10/2014 | Williams |
| 8,973,991 B2 | 3/2015 | Wuerstl |
| 8,973,992 B2 | 3/2015 | Guo |
| 9,156,379 B2 | 10/2015 | Williams |
| 9,174,554 B2 | 11/2015 | Maciejczyk |
| 9,308,838 B2 | 4/2016 | Miller |
| 9,315,124 B2 | 4/2016 | Lehman |
| 9,365,135 B2 | 6/2016 | Carpenter |
| 9,499,074 B2 | 11/2016 | Strong |
| 9,937,823 B2 | 4/2018 | Williams |
| 9,963,051 B2 | 5/2018 | Strong |
| 10,023,079 B2 | 7/2018 | Zhao |
| 10,035,436 B2 | 7/2018 | Zhou |
| 2002/0113470 A1 | 8/2002 | Kain |
| 2003/0151286 A1 | 8/2003 | Kain |
| 2003/0164632 A1 | 9/2003 | Sedlack |
| 2004/0070244 A1 | 4/2004 | Williams |
| 2005/0110318 A1* | 5/2005 | Meeker ............... B60N 2/2812 297/256.16 |
| 2009/0127902 A1 | 5/2009 | Meeker |
| 2011/0057489 A1 | 3/2011 | Greene |
| 2014/0265489 A1 | 9/2014 | Morgenstern |
| 2016/0311345 A1 | 10/2016 | Morgenstern |
| 2016/0347210 A1 | 12/2016 | Mason |
| 2016/0347212 A1 | 12/2016 | Mason |
| 2017/0355287 A1 | 12/2017 | Anderson |
| 2018/0056822 A1 | 3/2018 | Anderson |

FOREIGN PATENT DOCUMENTS

| | | |
|---|---|---|
| CN | 101508255 A | 8/2009 |
| CN | 203254992 U | 10/2013 |
| DE | 25 22 285 A1 | 12/1975 |
| DE | 42 04 232 A1 | 9/1992 |
| DE | 10 2005 025 570 A1 | 12/2006 |
| DE | 10 2009 017 601 A1 | 10/2010 |
| DE | 10 2016 109 691 A1 | 12/2016 |
| EP | 1 393 967 A1 | 3/2004 |
| FR | 2 928 882 A1 | 9/2009 |
| GB | 2 282 321 A | 4/1995 |

\* cited by examiner

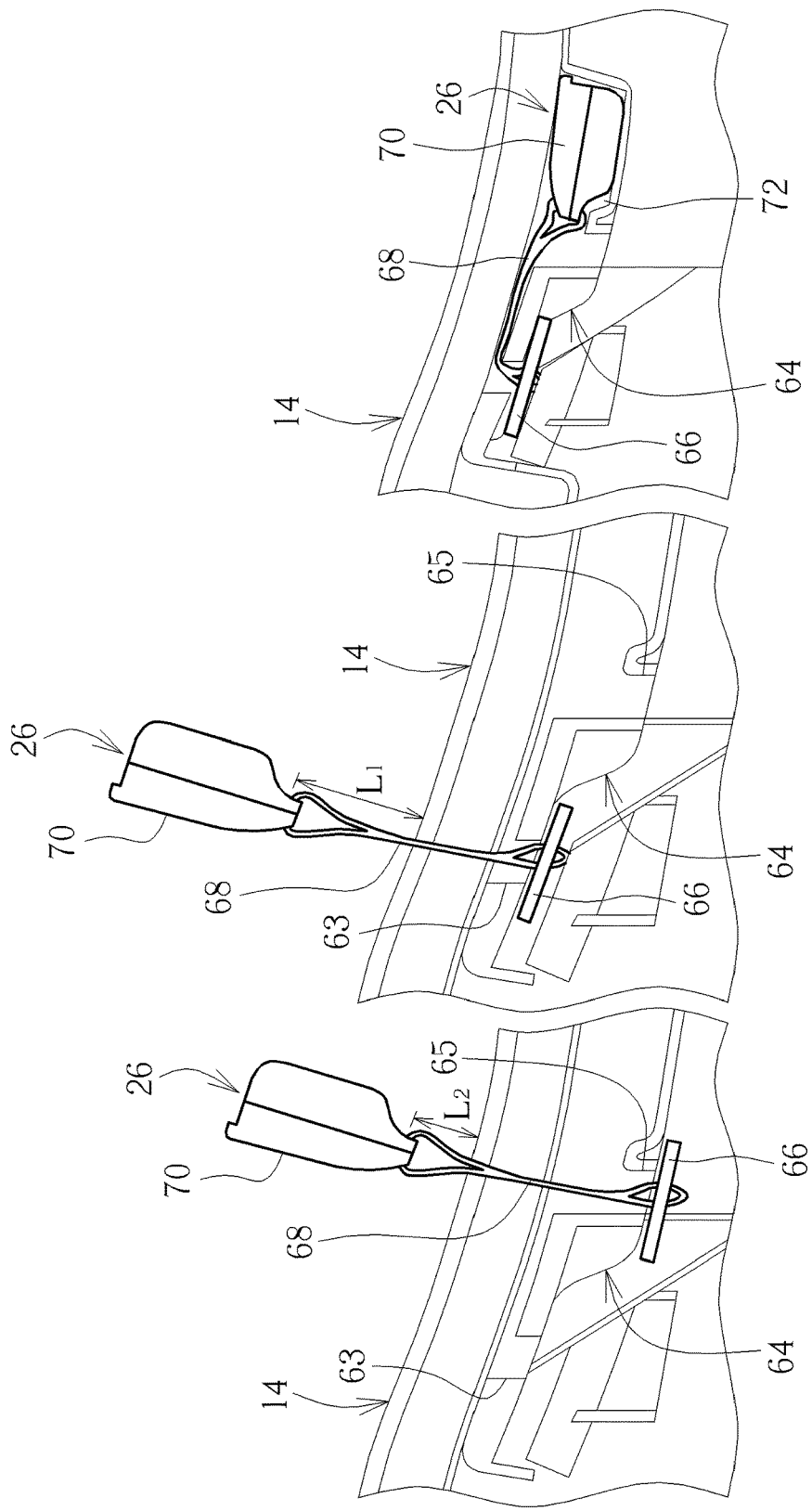

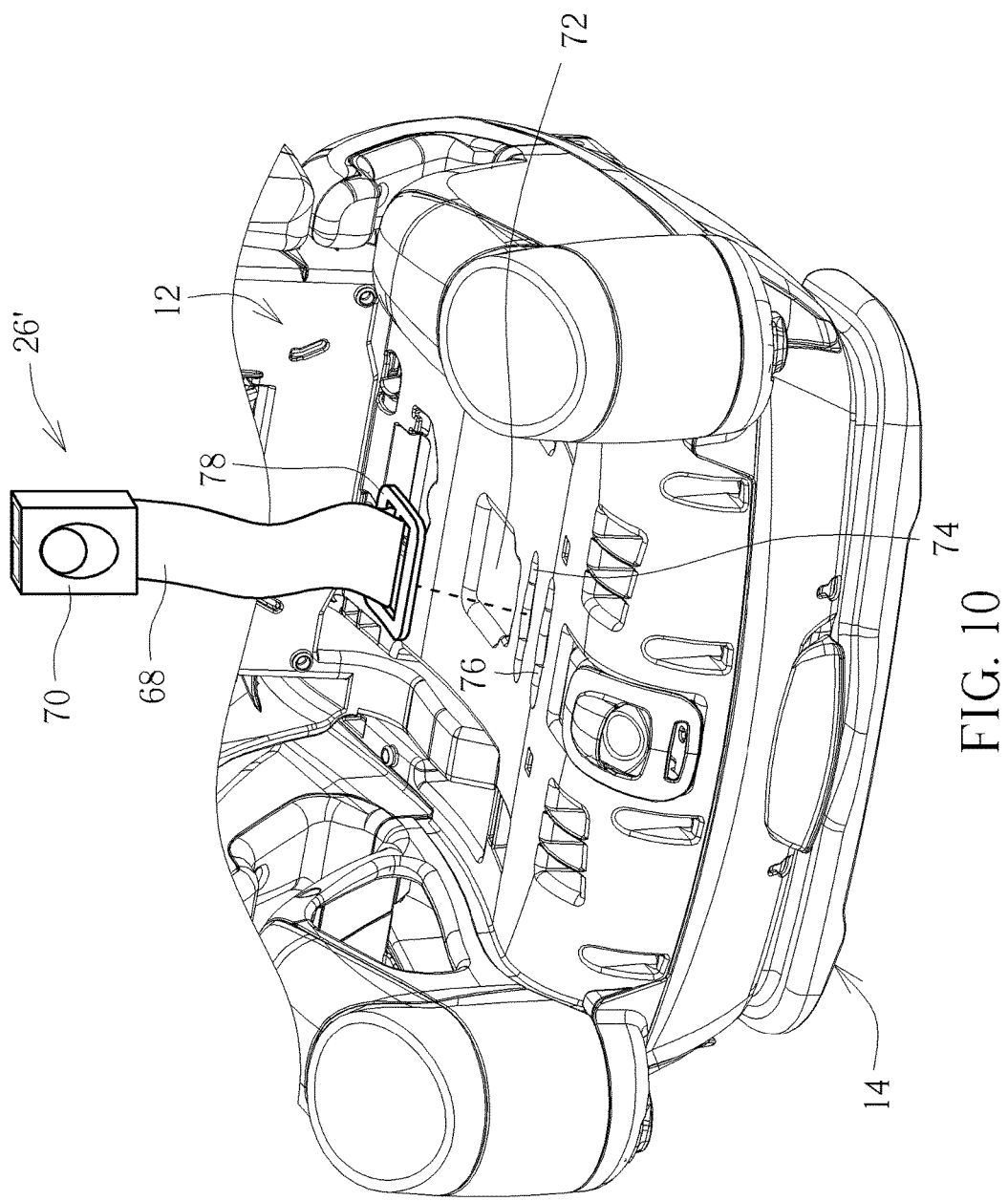

CHILD SAFETY SEAT

CROSS REFERENCE TO RELATED APPLICATIONS

This application claims the benefit of U.S. Provisional Application No. 62/420,964, which was filed on Nov. 11, 2016, and the benefit of U.S. Provisional Application No. 62/461,992, which was filed on Feb. 22, 2017, and is incorporated herein by reference.

BACKGROUND OF THE INVENTION

1. Field of the Invention

The present invention relates to a child safety seat, and more specifically, to a child safety seat utilizing a bridge plate to be permanently coupled to a shoulder strap and detachably attached to a central adjusting strap.

2. Description of the Prior Art

In general, a child safety seat is used in a motor vehicle and has a safety harness to properly restrain a child in the event of an accident. The safety harness usually has two shoulder strap portions and a central adjusting strap. Each shoulder strap portion is slidably routed from a front side of a seat back of the child safety seat to a rear side of the seat back through a corresponding opening formed on the seat back, and the child safety seat usually utilizes a bridge plate to connect a rear end of each shoulder strap portion located at the rear side of the seat back to the central adjusting strap. In this design, the rear end of each shoulder strap portion could be detached from the bridge plate while the central adjusting strap stays attached to the bridge plate. However, this design causes the rear end of the shoulder strap portion to fall through the opening easily when the shoulder strap portion is detached from the bridge plate, so as to add much frustration to use of the safety harness.

SUMMARY OF THE INVENTION

The present invention provides a child safety seat. The child safety seat includes a seat back, a seat bottom, a bridge plate, and a safety harness. The seat back has at least one routing opening. The seat bottom is connected to the seat back for cooperatively providing a seating space with the seat back. The bridge plate has a slot portion and a bending portion. The safety harness has a shoulder strap and a central adjusting strap. The shoulder strap has two shoulder strap portions. The two shoulder strap portions are slidably routed from a front side of the seat back to a rear side of the seat back through the routing opening. Two rear ends of the two shoulder strap portions located at the rear side of the seat back are permanently coupled to each other through the slot portion. The central adjusting strap is slidably routed to the rear side of the seat back through the seat bottom to be detachably attached to the bending portion for adjusting tightness of the safety harness.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a partial internal diagram of a seat bottom in FIG. 1.

FIG. 8 is a diagram of an anchor portion in FIG. 7 moving to a high position.

FIG. 9 is a diagram of an anchor in FIG. 8 being contained in a storage space.

FIG. 10 is a diagram of an anchor portion being detached from a seat bottom according to another embodiment of the present invention.

DETAILED DESCRIPTION

Figure 1:
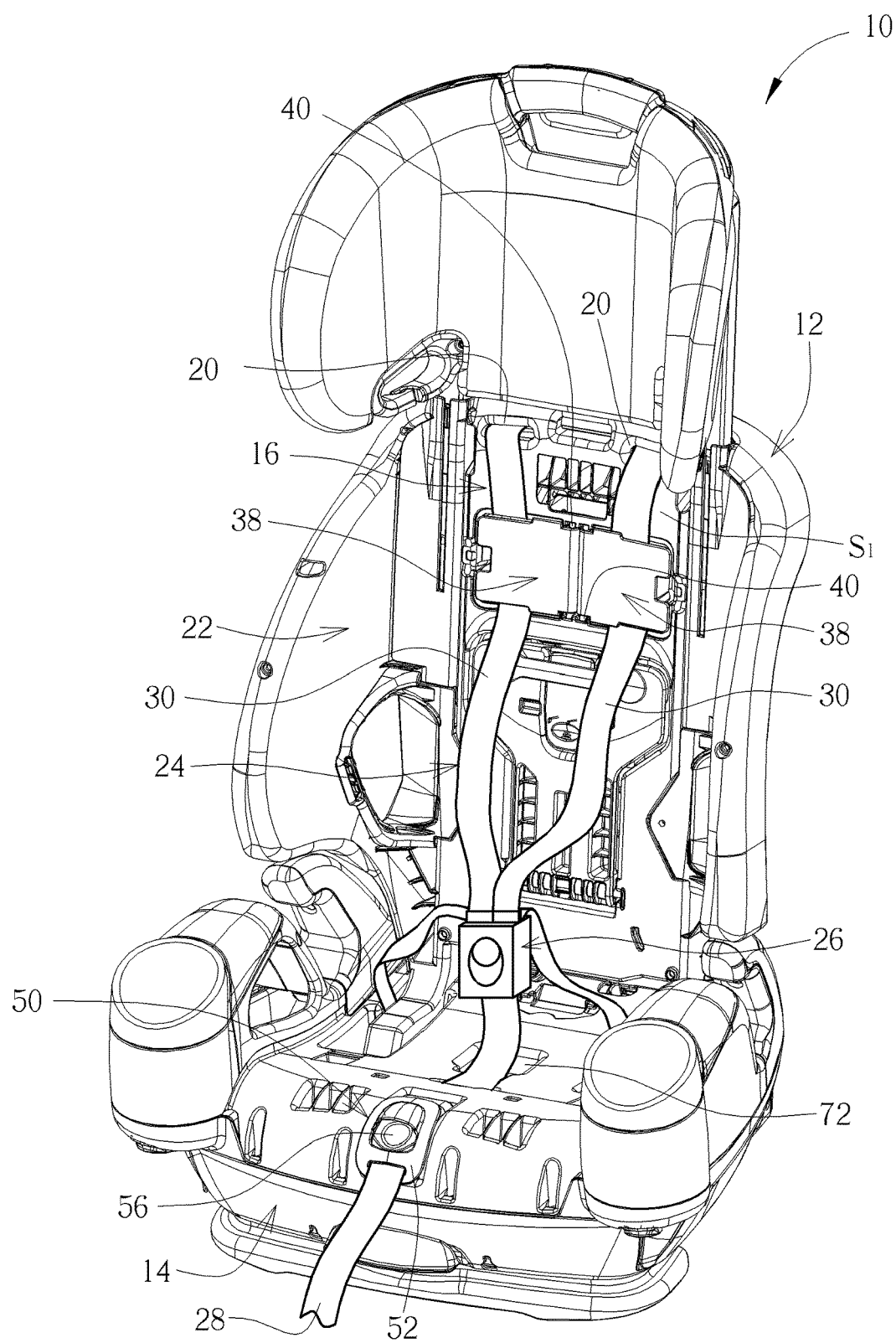
FIG. 1 is a diagram of a child safety seat according to an embodiment of the present invention.
Figure 2:
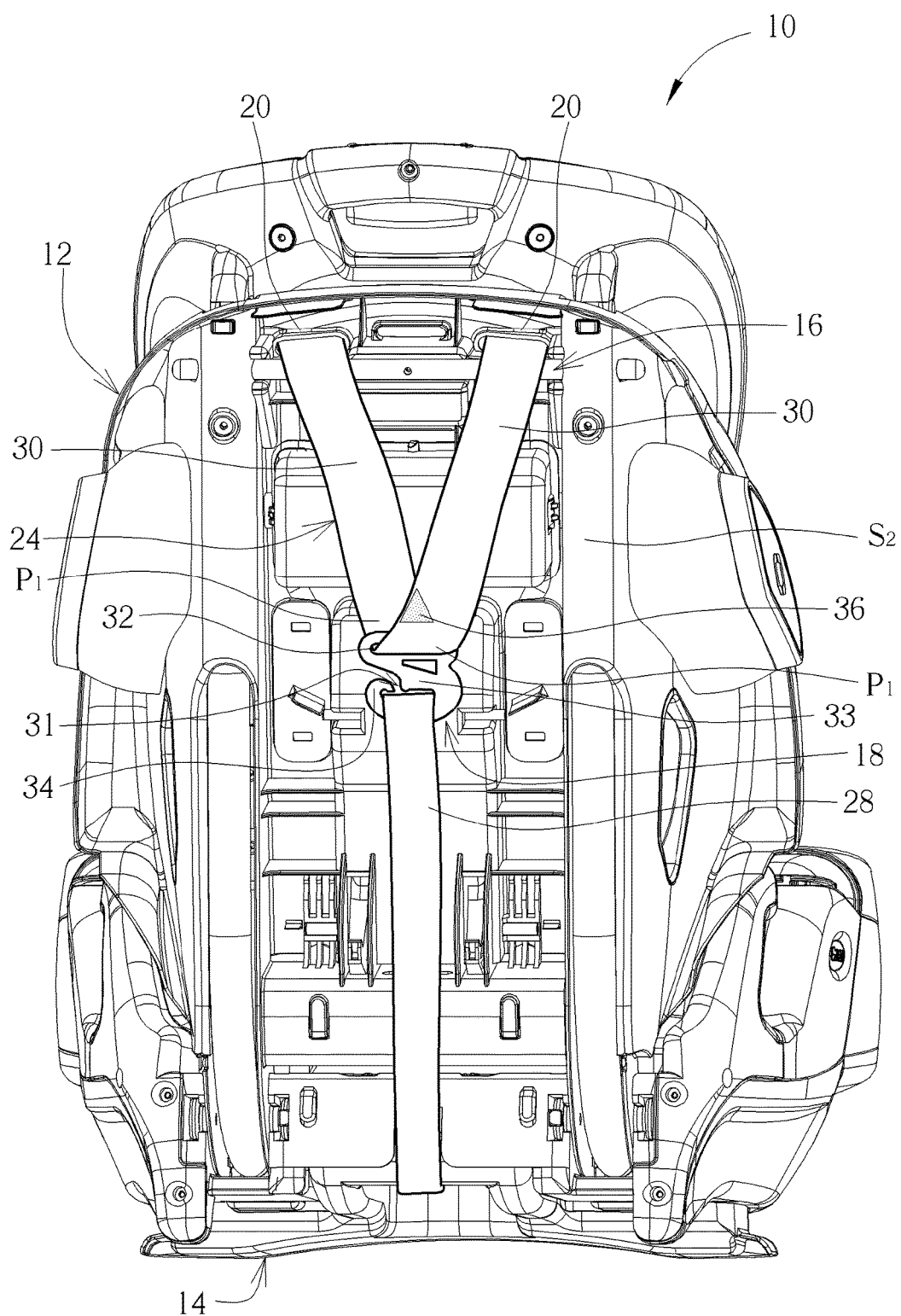
FIG. 2 is a diagram of the child safety seat in FIG. 1 from another viewing angle.

Please refer to FIG. 1 and FIG. 2. FIG. 1 is a diagram of a child safety seat 10 according to an embodiment of the present invention. FIG. 2 is a diagram of the child safety seat 10 in FIG. 1 from another viewing angle. As shown in FIG. 1 and FIG. 2, the child safety seat 10 includes a seat back 12, a seat bottom 14, a safety harness 16, and a bridge plate 18. The seat back 12 has at least one routing opening 20 formed thereon for the safety harness 16 to pass therethrough (two shown in FIG. 1, but not limited thereto, meaning that the present invention could adopt the design that the seat back 12 has only one routing opening 20 for the safety harness 16 to pass therethrough in another embodiment). The seat bottom 14 is connected to the seat back 12 for cooperatively providing a seating space 22 with the seat back 12, so that a child could sit in the seating space 22 comfortably. The safety harness 16 could have a shoulder strap 24, an anchor portion 26, and a central adjusting strap 28. The shoulder strap 24 has two shoulder strap portions 30. The two shoulder strap portions 30 are slidably routed from a front side $S_1$ of the seat back 12 to a rear side $S_2$ of the seat back 12 through the two routing openings 20. The anchor portion 26 is connected to the seat bottom 14 and is detachably connected to each shoulder strap portion 30 at the front side $S_1$ of the seat back 12 to properly constrain a child sitting in the seating space 22 for safety. As for the design of detachably connecting each shoulder strap portion 30 to the anchor portion 26, its related description is commonly seen in the prior art (e.g. each shoulder strap portion 30 could have a male buckle slidably disposed thereon to be engaged with a corresponding female buckle of the anchor portion 26) and omitted herein. To be noted, the anchor portion 26 could be omitted, meaning that the child safety seat 10 could only utilize the shoulder strap 24 to constrain a child sitting in the seating space 22 in another embodiment, to simplify the mechanical design of the child safety seat 10.

The structural design of the bridge plate 18 is described in detail as follows. As shown in FIG. 2, the bridge plate 18 (preferably made of metal material, but not limited thereto) has a slot portion 32, a body portion 33 and a bending portion 34. Two rear ends $P_1$ of the two shoulder strap portions 30 located at the rear side $S_2$ of the seat back 12 are permanently coupled to each other through the slot portion 32, so that the shoulder strap 24 could be non-detachably connected to the bridge plate 18 via the slot portion 32. The central adjusting strap 28 is slidably routed to the rear side S₂ of the seat back 12 through the seat bottom 14 to be detachably attached to the bending portion 34 (as shown in FIG. 1 and FIG. 2), so that a user could pull the central adjusting strap 28 as shown in FIG. 1 to adjust the overall tightness of the safety harness 16. In this embodiment, the safety harness 16 could further have a sewn portion 36. The sewn portion 36 is located at a position adjacent to the slot portion 32 as shown in FIG. 2 to sew the two shoulder strap portions 30 together for preventing the slot portion 32 from sliding along the two shoulder strap portions 30. Via the aforesaid connection design, the present invention can efficiently solve the prior art problem that the rear end of the shoulder belt could fall through the opening easily when the shoulder belt is detached from the bridge plate. Furthermore, in practical application, the slot portion 32, the body portion 33 and the bending portion 34 are integrally formed, where the slot portion 32 is an enclosed slot such that there is no opening for the shoulder strap 24 passing through the slot to escape from the slot. The bending portion 34 could be a hook (but not limited thereto) for detachably hooking the central adjusting strap 28, so that the user could detach the central adjusting strap 28 from the bending portion 34 conveniently. For example, an accessing path 31 is provided between the bending portion 34 and the body portion 33, allowing the central adjusting strap 28 to detach from the bending portion 34 via the accessing path 31. As shown in FIG. 2, the bending portion 34 and the body portion 33 delimit the accessing path 31 as a narrow path with at least one turning portion, such that the central adjusting strap 28 can be conveniently, while not accidentally, detached from the bending portion 34.

Figure 3:
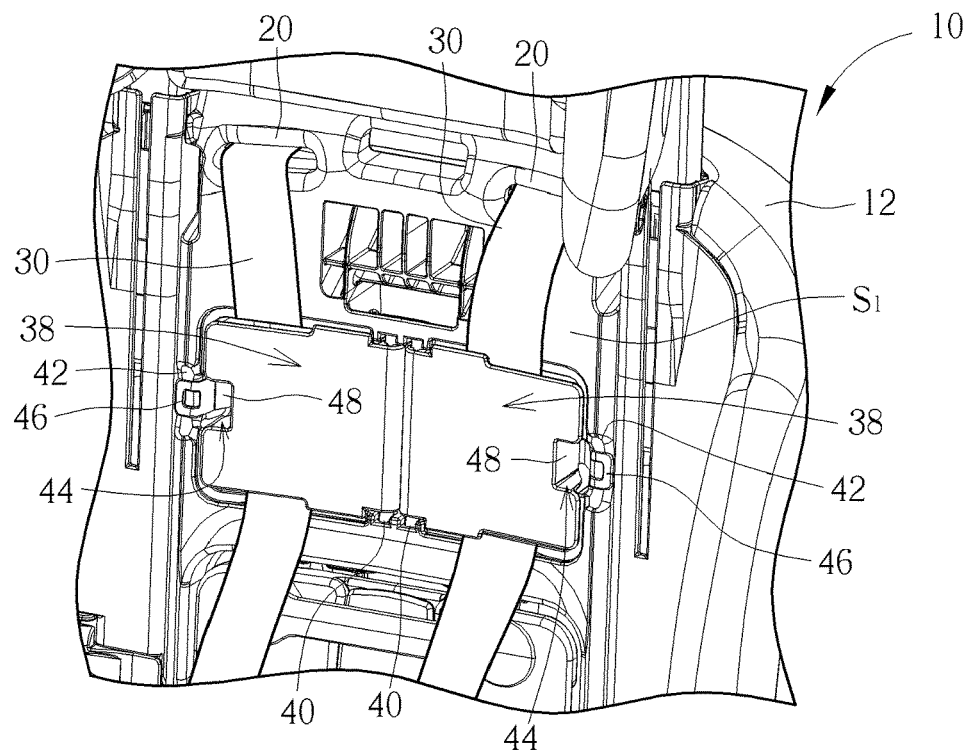
FIG. 3 is a partial enlarged diagram of the child safety seat in FIG. 1.
Figure 4:
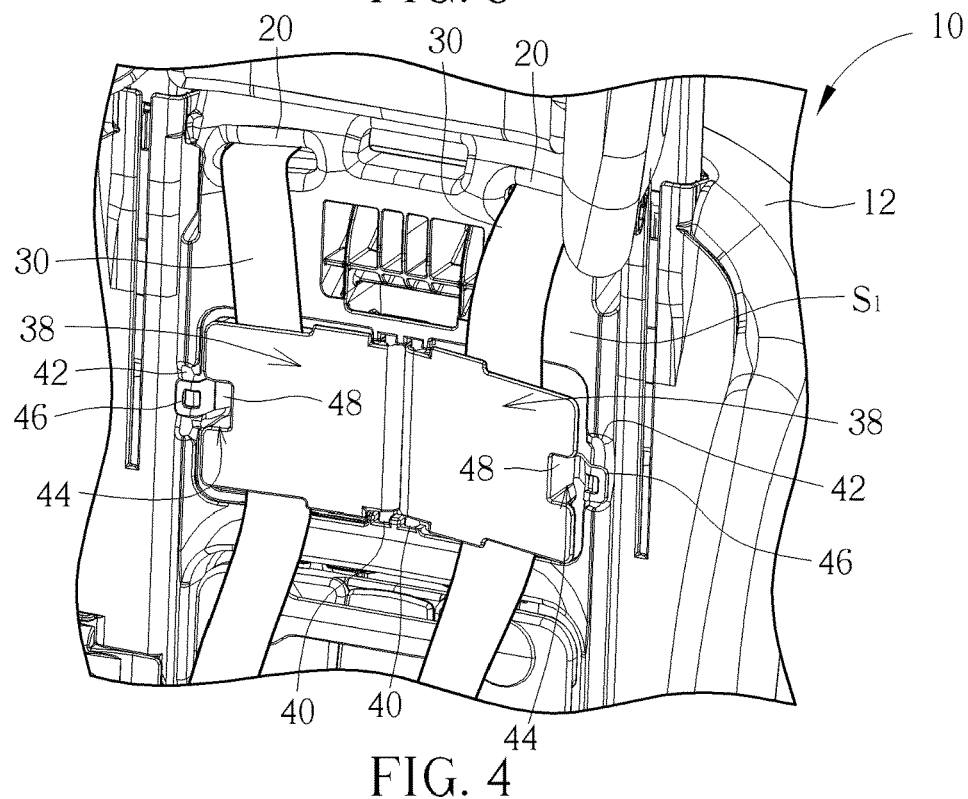
FIG. 4 is a diagram of a clamping door in FIG. 3 pivoting to an open position.

Please refer to FIG. 1, FIG. 3 and FIG. 4. FIG. 3 is a partial enlarged diagram of the child safety seat 10 in FIG. 1. FIG. 4 is a diagram of a clamping door 38 in FIG. 3 pivoting to an open position. As shown in FIG. 1, FIG. 3, and FIG. 4, the child safety seat 10 could further include the two clamping doors 38. Each clamping door 38 is openably hinged to the front side S₁ of the seat back 12 for pivoting between a closed position as shown in FIG. 3 and the open position as shown in FIG. 4. To be more specific, the clamping door 38 is hinged to the front side S₁ of the seat back 12 via a corresponding hinge 40, but not limited thereto, meaning that the present invention could adopt the design that the two clamping doors 38 are hinged to the front side S₁ of the seat back 12 together via one single hinge 40 in another embodiment. The seat back 12 could further have an engaging groove 42, and the clamping door 38 could have an engaging structure 44 corresponding to the engaging groove 42. In this embodiment, the hinge 40 could be oriented vertically along the front side S₁ of the seat back 12, and the engaging structure 44 could have a hook 46 and a bending arm 48 (preferably U-shaped, but not limited thereto) connected to the hook 46 and the clamping door 38. Accordingly, when the clamping door 38 pivots to the closed position as shown in FIG. 3, the bending arm 48 provides an elastic force to drive the hook 46 to be engaged with the engaging groove 42 to fix the clamping door 38 to the front side S₁ of the seat back 12, so that the shoulder strap portion 30 could be clamped by the clamping door 38 securely to be flat on the front side S₁ for storage convenience when the shoulder strap portion 30 is not in use. On the other hand, when the user wants to use the shoulder strap portion 30, the user just needs to push the hook 46 toward the clamping door 38 for detaching the hook 46 from the engaging groove 42. Subsequently, the user can pivot the clamping door 38 to the open position as shown in FIG. 4 for releasing clamping of the clamping door 38 on the shoulder strap portion 30, so that the shoulder strap portion 30 could be pulled out for use.

Figure 5:
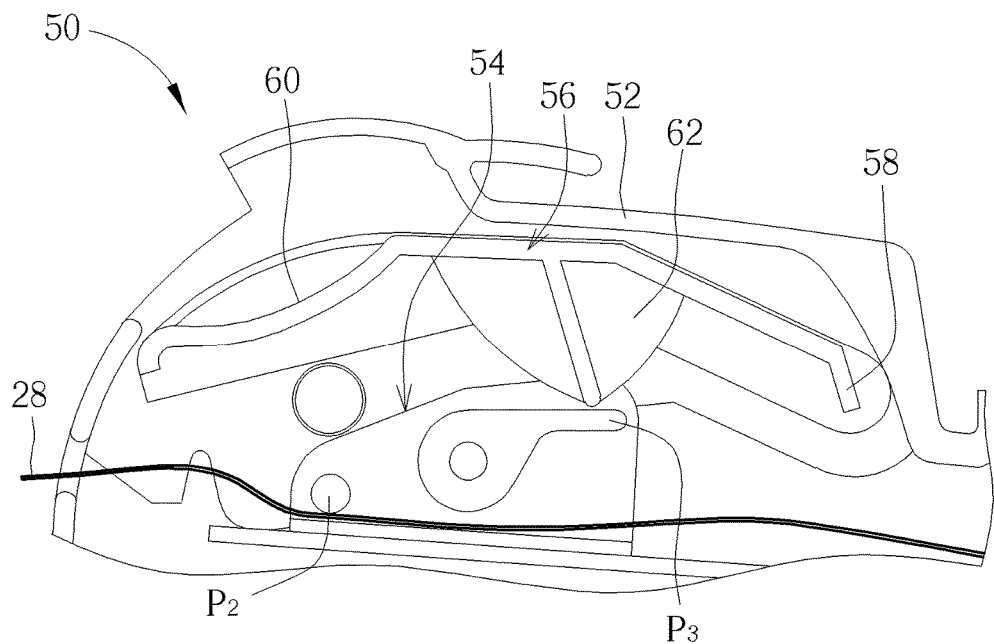
FIG. 5 is a partial internal diagram of a strap positioning mechanism in FIG. 1.
Figure 6:
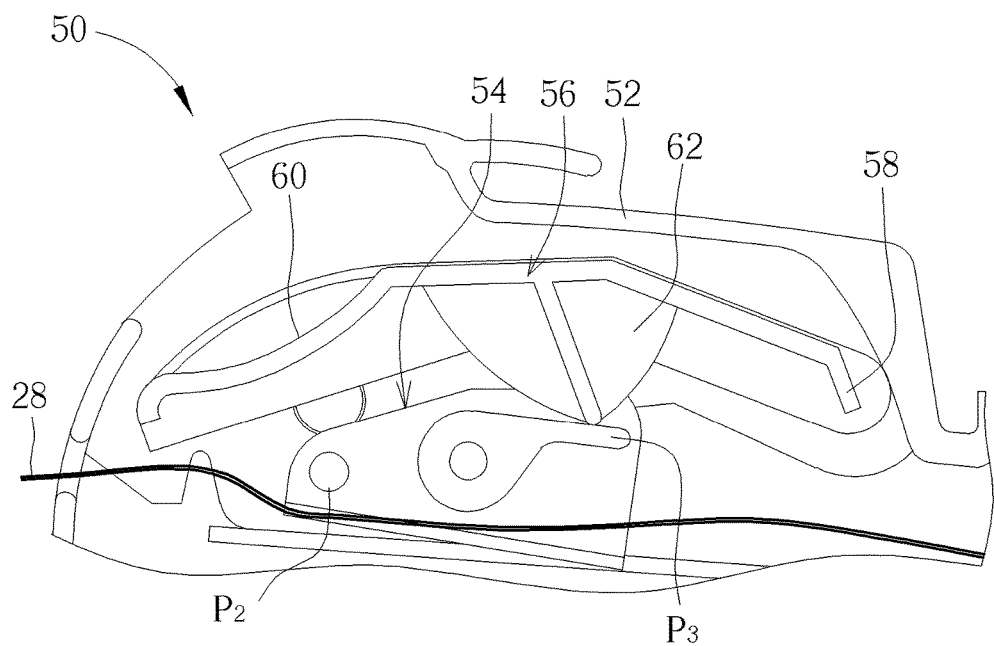
FIG. 6 is a diagram of a central adjusting strap in FIG. 5 being released.

In practical application, the child safety seat 10 could further adopt the strap positioning design. For example, please refer to FIG. 1, FIG. 5 and FIG. 6. FIG. 5 is a partial internal diagram of a strap positioning mechanism 50 in FIG. 1. FIG. 6 is a diagram of the central adjusting strap 28 in FIG. 5 being released. As shown in FIG. 1, FIG. 5 and FIG. 6, the child safety seat 10 could further include the strap positioning mechanism 50 disposed on the seat bottom 14. The strap positioning mechanism 50 includes a containing housing 52, a clamping plate 54, and a push button 56. The containing housing 52 is disposed on the seat bottom 14. The clamping plate 54 is pivotally disposed in the containing housing 52 and has a clamping end P₂ and a releasing end P₃, and the push button 56 is pivotable between a non-pressed position as shown in FIG. 5 and a pressed position as shown in FIG. 6 relative to the containing housing 52. In this embodiment, the push button 56 could have a pivot portion 58, a button portion 60, and a driving portion 62 located between the pivot portion 58 and the button portion 60, and a pivot position where the clamping plate 54 is pivoted to the containing housing 52 could preferably be located between the driving portion 62 and the clamping end P₂. The pivot portion 58 is pivoted to the containing housing 60 to make the button portion 60 pivotable between the pressed position and the non-pressed position. The driving portion 62 abuts against the releasing end P₃.

Via the aforesaid designs, when the user wants to adjust the tightness of the safety harness 16, the user just needs to press the button portion 60 to the pressed position as shown in FIG. 6. Accordingly, with downward pivoting of the button portion 60 relative to the pivot portion 58, the driving portion 62 presses the releasing end P₃ to make the clamping end P₂ tilted upward for releasing the central adjusting strap 28. At this time, since the central adjusting strap 28 is no longer clamped by the clamping end P₂, the user can pull the central adjusting strap 28 out of the seat bottom 14 or retract the central adjusting strap 28 back in the seat bottom 14 to properly adjust the tightness of the safety harness 16. On the other hand, after the aforesaid tightness adjustment process is completed, the user could release the button portion 60 back to the non-pressed position as shown in FIG. 5 (e.g. utilizing a torsional spring connected to the push button 56 and the containing casing 52 to return the button portion 60 back to its original position, but not limited thereto). With upward pivoting of the button portion 60 to the non-pressed position, the clamping end P₂ clamps the central adjusting strap 28 again since the driving portion 62 moves upward to the position as shown in FIG. 5 to release the releasing end P₃ back to its original position (e.g. utilizing a torsional spring connected to the clamping plate 54 and the containing casing 52 to return the clamping plate 54 back to its original position, but not limited thereto), so as to immobilize the central adjusting strap 28. In such a manner, via the design of placing pivot of the push button 56 behind the clamping plate 54 for exerting larger torque on the clamping plate 54 when the button portion 60 is pressed, the strap positioning mechanism 50 can reduce the force required to release the central adjusting strap 28, so that pressing the push button 56 can be labor-saving to help the user operate the strap positioning mechanism 50 smoothly and easily.

It should be mentioned that the present invention could further adopt the anchor strap adjusting design. For example, please refer to FIG. 7 and FIG. 8. FIG. 7 is a partial internal diagram of the seat bottom 14 in FIG. 1. FIG. 8 is a diagram of the anchor portion 26 in FIG. 7 moving to a high position.

As shown in FIG. 7 and FIG. 8, the seat bottom 14 could have a guide rail structure 64 formed therein and a positioning plate 66 (e.g. a 3-bar slide) slidable along the guide rail structure 64 between a low position as shown in FIG. 7 and the high position as shown in FIG. 8, and the anchor portion 26 has a connection strap 68 and an anchor 70. The guide rail structure 64 could have a first slot 63 corresponding to the high position and a second slot 65 corresponding to the low position. The connection strap 68 is connected to the positioning plate 66 and the anchor 70. Accordingly, when the positioning plate 66 slides to the high position as shown in FIG. 8 along the guide rail structure 64, the connection strap 68 extends out of the first slot 63 to have a first length $L_1$ relative to the seat bottom 14, so as to elongate the anchor portion 26 for better fitting a larger child. On the other hand, when the positioning plate 66 slides to the low position as shown in FIG. 7 along the guide rail structure 64, the connection strap 68 extends out of the second slot 65 to have a second length $L_2$ larger than the first length $L_1$, so as to shorten the anchor portion 26 for better fitting a smaller child. Furthermore, as shown in FIG. 9, which is a diagram of the anchor 70 in FIG. 8 being contained in a storage space 72, the seat bottom 14 could further have the containing space 72, so that the anchor 70 could be contained in the containing space 72 for storage convenience when the anchor portion 26 is not in use.

To be noted, the present invention could adopt the design that the anchor portion could be directly detached from the seat bottom for positioning the anchor portion at different positions on the seat bottom. For example, please refer to FIG. 10, which is a diagram of an anchor portion 26' being detached from a seat bottom 14' according to another embodiment of the present invention. Components both mentioned in this embodiment and the aforesaid embodiment represent components with similar structures and functions, and the related description is omitted herein. As shown in FIG. 10, the seat bottom 14' could have a first slot 74 close to the seat back 12 (partially depicted in FIG. 10) and a second slot 76 away from the seat back 12, and the anchor portion 26' could have the connection strap 68, the anchor 70, and a positioning plate 78 (preferably a 3-bar slide, but not limited thereto). The connection strap 68 is connected to the positioning plate 78 and the anchor 70. Accordingly, when the positioning plate 78 is directly detached from the seat bottom 14' as shown in FIG. 10 and then is detachably disposed through the first slot 74 to make the connection strap 68 extend out of the first slot 74, the anchor portion 26' is positioned close to the seat back 12 on the seat bottom 14 for better fitting a smaller child. On the other hand, when the positioning plate 78 is detachably disposed through the second slot 76 to make the connection strap 68 extend out of the second slot 76, the anchor portion 26' is positioned away from the seat back 12 on the seat bottom 14 for better fitting a larger child. Similarly, the anchor 70 could be contained in the containing space 72 for storage convenience when the anchor portion 26' is not in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
a seat back having at least one routing opening;
a seat bottom connected to the seat back for cooperatively providing a seating space with the seat back;
a bridge plate having a slot portion and a bending portion;
a safety harness having a shoulder strap and a central adjusting strap, the shoulder strap having two shoulder strap portions, the two shoulder strap portions being slidably routed from a front side of the seat back to a rear side of the seat back through the routing opening, two rear ends of the two shoulder strap portions located at the rear side of the seat back being permanently coupled to each other through the slot portion, the central adjusting strap being slidably routed to the rear side of the seat back through the seat bottom to be detachably attached to the bending portion for adjusting tightness of the safety harness; and
two clamping doors openably hinged to the front side of the seat back for pivoting between an open position and a closed position;
wherein when each clamping door pivots to the closed position, the two shoulder strap portions are clamped to be flat on the front side by the two clamping doors;
when the clamping door pivots to the open position, clamping of the clamping door on the corresponding shoulder strap portion is released.

2. The child safety seat of claim 1, wherein the two clamping doors are hinged to the front side of the seat back via at least one hinge, and the at least one hinge is oriented vertically along the front side of the seat back.

3. The child safety seat of claim 1, wherein the seat back further has an engaging groove, the clamping door has an engaging structure, and when the clamping door pivots to the closed position, the engaging structure is detachably engaged with the engaging groove to fix the clamping door to the front side of the seat back.

4. The child safety seat of claim 3, wherein the engaging structure has a hook and a bending arm, and the bending arm is connected to the hook and the clamping door for providing an elastic force to drive the hook to be engaged with the engaging groove when the clamping door pivots to the closed position.

5. The child safety seat of claim 1, wherein the two shoulder strap portions are sewn to each other at a position adjacent to the slot portion for preventing the slot portion from sliding along the two shoulder strap portions.

6. The child safety seat of claim 1, wherein the bridge plate further has a body portion integrally formed with the slot portion and the bending portion, the bending portion is a hook for detachably hooking the central adjusting strap, and an accessing path is delimited between the hook and the body portion.

7. The child safety seat of claim 1 further comprising:
a strap positioning mechanism disposed on the seat bottom, the strap positioning mechanism comprising:
a containing housing disposed on the seat bottom;
a clamping plate pivotally disposed in the containing housing and having a clamping end and a releasing end; and
a push button pivotable between a pressed position and a non-pressed position relative to the containing housing;
wherein when the push button is pressed to the pressed position, the push button presses the releasing end to make the clamping end tilted upward for releasing the central adjusting strap;
when the push button is released to the non-pressed position, the releasing end returns to its original position to make the clamping end clamp the central adjusting strap for immobilizing the central adjusting strap.

8. The child safety seat of claim 7, wherein the push button has a pivot portion, a button portion, and a driving portion located between the pivot portion and the button portion, the pivot portion is pivoted to the containing housing to make the button portion pivotable between the pressed position and the non-pressed position, the driving portion abuts against the releasing end, and a pivot position where the clamping plate is pivoted to the containing housing is located between the driving portion and the clamping end;

wherein when the button portion is pressed to the pressed position, the driving portion presses the releasing end to make the clamping end tilted upward for releasing the central adjusting strap; when the button portion is released to the non-pressed position, the releasing end returns to its original position to make the clamping end clamp the central adjusting strap for immobilizing the central adjusting strap.

9. The child safety seat of claim 1, wherein the safety harness further have an anchor portion, and the anchor portion is connected to the seat bottom and is detachably connected to each shoulder strap portion at the front side of the seat back.

10. The child safety seat of claim 9, wherein the seat bottom has a guide rail structure formed therein and a positioning plate slidable along the guide rail structure between a high position and a low position, the guide rail structure has a first slot corresponding to the high position and a second slot corresponding to the low position, the anchor portion has a connection strap and an anchor, and the connection strap is connected to the positioning plate and the anchor;

wherein when the positioning plate slides to the high position along the guide rail structure, the connection strap extends out of the first slot to have a first length relative to the seat bottom;

when the positioning plate slides to the low position along the guide rail structure, the connection strap extends out of the second slot to have a second length less than the first length.

11. The child safety seat of claim 10, wherein the seat bottom further has a containing space for containing the anchor.

12. The child safety seat of claim 9, wherein the seat bottom has a first slot close to the seat back and a second slot away from the seat back, the anchor portion has a connection strap, an anchor, and a positioning plate, and the connection strap is connected to the positioning plate and the anchor;

wherein when the positioning plate is detachably disposed through the first slot to make the connection strap extend out of the first slot, the anchor portion is positioned close to the seat back on the seat bottom;

when the positioning plate is detachably disposed through the second slot to make the connection strap extend out of the second slot, the anchor portion is positioned away from the seat back on the seat bottom.

13. The child safety seat of claim 12, wherein the seat bottom further has a containing space for containing the anchor.

14. A child safety seat comprising:

a seat back having at least one routing opening;
    a seat bottom connected to the seat back for cooperatively providing a seating space with the seat back;
    a bridge plate having a slot portion and a bending portion;
    a safety harness having a shoulder strap and a central adjusting strap, the shoulder strap having two shoulder strap portions, the two shoulder strap portions being slidably routed from a front side of the seat back to a rear side of the seat back through the routing opening, two rear ends of the two shoulder strap portions located at the rear side of the seat back being permanently coupled to each other through the slot portion, the central adjusting strap being slidably routed to the rear side of the seat back through the seat bottom to be detachably attached to the bending portion for adjusting tightness of the safety harness; and
    a strap positioning mechanism disposed on the seat bottom, the strap positioning mechanism comprising:
        a containing housing disposed on the seat bottom;
        a clamping plate pivotally disposed in the containing housing and having a clamping end and a releasing end; and
        a push button pivotable between a pressed position and a non-pressed position relative to the containing housing;
    wherein when the push button is pressed to the pressed position, the push button presses the releasing end to make the clamping end tilted upward for releasing the central adjusting strap;
    when the push button is released to the non-pressed position, the releasing end returns to its original position to make the clamping end clamp the central adjusting strap for immobilizing the central adjusting strap.

15. The child safety seat of claim 14, wherein the two shoulder strap portions are sewn to each other at a position adjacent to the slot portion for preventing the slot portion from sliding along the two shoulder strap portions.

16. The child safety seat of claim 14, wherein the bridge plate further has a body portion integrally formed with the slot portion and the bending portion, the bending portion is a hook for detachably hooking the central adjusting strap, and an accessing path is delimited between the hook and the body portion.

17. The child safety seat of claim 14, wherein the push button has a pivot portion, a button portion, and a driving portion located between the pivot portion and the button portion, the pivot portion is pivoted to the containing housing to make the button portion pivotable between the pressed position and the non-pressed position, the driving portion abuts against the releasing end, and a pivot position where the clamping plate is pivoted to the containing housing is located between the driving portion and the clamping end;

wherein when the button portion is pressed to the pressed position, the driving portion presses the releasing end to make the clamping end tilted upward for releasing the central adjusting strap; when the button portion is released to the non-pressed position, the releasing end returns to its original position to make the clamping end clamp the central adjusting strap for immobilizing the central adjusting strap.

18. The child safety seat of claim 14, wherein the safety harness further have an anchor portion, and the anchor portion is connected to the seat bottom and is detachably connected to each shoulder strap portion at the front side of the seat back.

19. The child safety seat of claim 18, wherein the seat bottom has a guide rail structure formed therein and a positioning plate slidable along the guide rail structure between a high position and a low position, the guide rail structure has a first slot corresponding to the high position and a second slot corresponding to the low position, the anchor portion has a connection strap and an anchor, and the connection strap is connected to the positioning plate and the anchor;

wherein when the positioning plate slides to the high position along the guide rail structure, the connection strap extends out of the first slot to have a first length relative to the seat bottom;

when the positioning plate slides to the low position along the guide rail structure, the connection strap extends out of the second slot to have a second length less than the first length.

20. The child safety seat of claim 19, wherein the seat bottom further has a containing space for containing the anchor.

21. The child safety seat of claim 18, wherein the seat bottom has a first slot close to the seat back and a second slot away from the seat back, the anchor portion has a connection strap, an anchor, and a positioning plate, and the connection strap is connected to the positioning plate and the anchor;

wherein when the positioning plate is detachably disposed through the first slot to make the connection strap extend out of the first slot, the anchor portion is positioned close to the seat back on the seat bottom;

when the positioning plate is detachably disposed through the second slot to make the connection strap extend out of the second slot, the anchor portion is positioned away from the seat back on the seat bottom.

22. The child safety seat of claim 21, wherein the seat bottom further has a containing space for containing the anchor.

23. A child safety seat comprising:
a seat back having at least one routing opening;
a seat bottom connected to the seat back for cooperatively providing a seating space with the seat back, the seat bottom having a guide rail structure formed therein and a positioning plate slidable along the guide rail structure between a high position and a low position, the guide rail structure having a first slot corresponding to the high position and a second slot corresponding to the low position;
a bridge plate having a slot portion and a bending portion; and
a safety harness having a shoulder strap, an anchor portion and a central adjusting strap, the shoulder strap having two shoulder strap portions, the two shoulder strap portions being slidably routed from a front side of the seat back to a rear side of the seat back through the routing opening, two rear ends of the two shoulder strap portions located at the rear side of the seat back being permanently coupled to each other through the slot portion, the central adjusting strap being slidably routed to the rear side of the seat back through the seat bottom to be detachably attached to the bending portion for adjusting tightness of the safety harness, the anchor portion being detachably connected to each shoulder strap portion at the front side of the seat back, the anchor portion having a connection strap and an anchor, and the connection strap being connected to the positioning plate and the anchor;

wherein when the positioning plate slides to the high position along the guide rail structure, the connection strap extends out of the first slot to have a first length relative to the seat bottom;

when the positioning plate slides to the low position along the guide rail structure, the connection strap extends out of the second slot to have a second length less than the first length.

24. The child safety seat of claim 23, wherein the two shoulder strap portions are sewn to each other at a position adjacent to the slot portion for preventing the slot portion from sliding along the two shoulder strap portions.

25. The child safety seat of claim 23, wherein the bridge plate further has a body portion integrally formed with the slot portion and the bending portion, the bending portion is a hook for detachably hooking the central adjusting strap, and an accessing path is delimited between the hook and the body portion.

26. The child safety seat of claim 23, wherein the seat bottom further has a containing space for containing the anchor.

* * * * *